(No Model.)

W. E. PRUYNE.
HALTER.

No. 422,626.  Patented Mar. 4, 1890.

WITNESSES:
C. L. Bendixon
H. M. Osmans

INVENTOR:
Wallace E. Pruyne
BY
Dull, Laass & Dull
his ATTORNEYS

UNITED STATES PATENT OFFICE.

WALLACE E. PRUYNE, OF NORWICH, NEW YORK, ASSIGNOR OF ONE-HALF TO FREDERICK F. HALL, OF SAME PLACE.

HALTER.

SPECIFICATION forming part of Letters Patent No. 422,626, dated March 4, 1890.

Application filed November 27, 1889. Serial No. 331,769. (No model.)

*To all whom it may concern:*

Be it known that I, WALLACE E. PRUYNE, of Norwich, in the county of Chenango, in the State of New York, have invented new and useful Improvements in Halters, of which the following, taken in connection with the accompanying drawings, is a full, clear, and exact description.

The object of this invention is to provide a halter which shall afford such a hold on a horse that when said halter is subjected to strain it will cramp the horse's head so as to compel the horse to yield to the hold of the halter; and the object also is to adapt the halter to be readily placed over the headstall or bridle of the horse; and to that end the invention consists in the improved construction and combination of parts hereinafter described, and specifically set forth in the claim.

Figure 1:
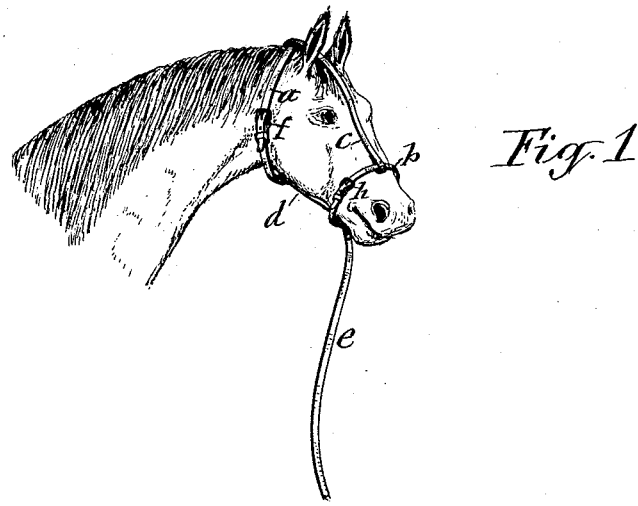
Figure 2:
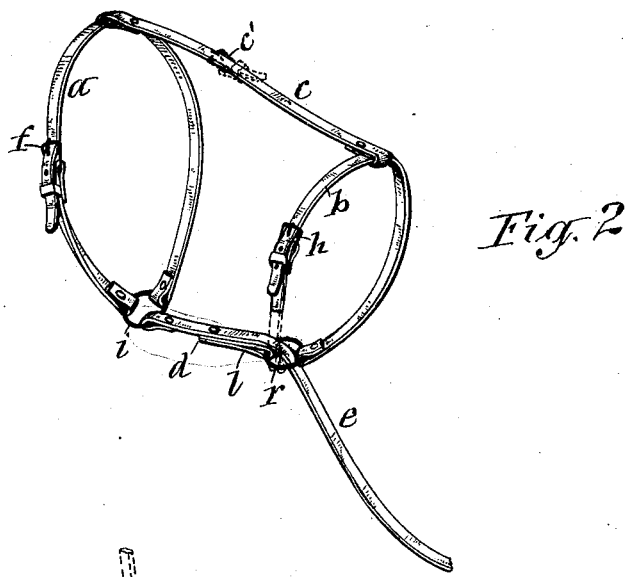
Figure 3:
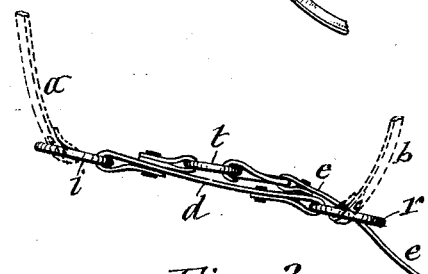

In the annexed drawings, Figure 1 is a side view of a horse's head, with my improved halter applied thereto. Fig. 2 is an enlarged detached perspective view of the halter, and Fig. 3 is a detail view of a modification of the jaw-strap and attachment of the stale.

Similar letters of reference indicate corresponding parts.

$a$ denotes the throat-lash or neck-strap, which passes around the horse's neck near the ears of the horse, as shown in Fig. 1 of the drawings.

$b$ represents the nose-strap, which encompasses the lower portion of the horse's head.

$c$ represents the front-strap, which is at one end attached to the upper portion of the throat-lash $a$, and passes thence between the ears of the horse and down on the front of the horse's head, and is connected at its lower end to the upper portion of the nose-strap $b$.

$d$ designates the jaw-lash, which connects the lower portion of the throat-lash $a$ with the lower portion of the nose-strap, and $e$ is the stale or hitching-strap.

In order to allow the said halter to be placed over the headstall or bridle on the horse, I connect the two ends of the throat-lash by a buckle $f$, and also connect the two ends of the nose-strap $b$, in a similar manner, by a buckle $h$, so that by disconnecting the ends of said straps they can be passed around the horse's neck and head and over the headstall and then secured to the horse by buckling said straps. The throat-lash is provided with a ring $i$ under the throat of the horse, and the nose-strap is provided with a ring $r$ under the horse's head, and the jaw-lash $d$ is connected to said rings. The stale $e$ is attached to the upper portion of the jaw-lash, and passes thence freely through the lower ring $r$ so as to allow it to slide lengthwise thereon. The result is that when the horse pulls on the stale or hitching-strap $e$ the throat-lash $a$ and nose-strap $b$ are drawn tightly around the neck and nose of the horse, and thus compel the horse to yield and slacken its draft on the stale $e$.

The attachment of the jaw-lash $d$ and stale $e$, I prefer to make by passing the attaching end of the stale through the upper ring $i$, and then folding it over onto the stale and either riveting or sewing it thereto, and a loop $l$ passes through the ring $r$ and is riveted or sewed to the stale $e$, near its attachment to the ring $i$, as shown in Fig. 2 of the drawings. I do not, however, wish to be limited to said construction, inasmuch as the same is susceptible of various modifications, one of which is illustrated in Fig. 3 of the drawings, in which the jaw-lash $d$ is formed of a strap passing through both rings $r$ and $i$ and fastened either by rivets or by sewing, and a ring $t$ is attached to the upper or front side of the said jaw-lash, to which ring the stale may be connected by a snap-hook secured to the end of the stale. Furthermore, the front-strap $c$ may be made adjustable to accommodate the halter to horse's heads of different sizes, by making said strap in two parts and connecting said parts to each other by a buckle $c'$, as indicated by dotted lines in Fig. 2 of the drawings.

Having described my invention, what I claim as new, and desire to secure by Letters Patent, is—

The improved halter, composed of the throat-lash or neck-strap $a$, nose-strap $b$, the front-strap $c$, extending from the top of the neck-strap down between the ears of the horse and along the front of the head and to the top portion of the nose-strap, the jaw-lash $d$, extending from the bottom portion of the neck-strap to the bottom portion of the nose-strap and provided with the ring $r$, and the stale $e$, connected to said jaw-lash and passing through the aforesaid ring, substantially as described and shown.

In testimony whereof I have hereunto signed my name this 26th day of November, 1839.

WALLACE E. PRUYNE. [L. S.]

Witnesses:
C. B. CHAPMAN,
WM. MASON.